US007368024B2

(12) United States Patent
Majumdar et al.

(10) Patent No.: US 7,368,024 B2
(45) Date of Patent: May 6, 2008

(54) BALANCED TIRE ASSEMBLY AND METHOD

(75) Inventors: Ramendra Nath Majumdar, Hudson, OH (US); Bruce Raymond Hahn, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 133 days.

(21) Appl. No.: 11/218,133

(22) Filed: Sep. 1, 2005

(65) Prior Publication Data

US 2007/0044893 A1    Mar. 1, 2007

(51) Int. Cl.
*B29D 30/00* (2006.01)
*B60C 5/00* (2006.01)
*B60C 5/14* (2006.01)

(52) U.S. Cl. .................. 156/110.1; 156/115; 152/154.1; 152/450

(58) Field of Classification Search .............. 152/154.1
See application file for complete search history.

(56) References Cited

U.S. PATENT DOCUMENTS

| | | | |
|---|---|---|---|
| 2,687,918 A | 6/1954 | Bell et al. ....................... 301/5 |
| 3,987,833 A | 10/1976 | Powell et al. | |
| 4,101,494 A | 7/1978 | Kent et al. .................. 260/29.6 |
| 4,106,964 A | 8/1978 | DeVittorio | |
| 4,139,395 A | 2/1979 | Dunlap | |
| 4,665,963 A | 5/1987 | Timar et al. | |
| 4,867,792 A | 9/1989 | Ronlan ....................... 106/189 |
| 4,895,610 A | 1/1990 | Egan | |
| 4,911,954 A * | 3/1990 | Tatsuno et al. .............. 427/409 |
| 5,085,942 A | 2/1992 | Hong et al. | |
| 5,540,767 A | 7/1996 | Ronlan ................... 106/287.35 |
| 5,728,243 A | 3/1998 | Heffernan et al. ............ 156/75 |
| 2004/0103967 A1 | 6/2004 | Majumdar et al. | |

FOREIGN PATENT DOCUMENTS

| | | |
|---|---|---|
| EP | 0 281 252 A1 | 9/1988 |
| EP | 1 435 301 A1 | 7/2004 |
| JP | 58-152612 | 9/1983 |
| JP | 2002-122501 * | 4/2002 |
| WO | 01/68387 A1 | 9/2001 |

OTHER PUBLICATIONS

Machine translation of JP 2002-122501.*
Machine translation of JP 2002-122501 (document published in Apr. 2002).*
European Patent Office, European Search Report and Written Opinion in Application No. EP06119920, Nov. 11, 2006, 6 pages.

* cited by examiner

*Primary Examiner*—Justin R. Fischer
(74) *Attorney, Agent, or Firm*—Wood, Herron & Evans, LLP

(57) ABSTRACT

A balance material is applied to the inner surface of a tire at one or more selected locations to offset an imbalance of the tire. The balance material is fluently applied to the inner surface at a first viscosity, whereafter the balance material transforms to exhibit a second viscosity that is higher than the first viscosity and remains affixed to the inner surface of the tire at the point of application. A method of balancing a tire comprises determining the location and amount of balance material needed to correct an imbalance of the tire, applying the balance material at a first viscosity, and transforming the balance material to have a second viscosity sufficient to maintain the balance material at the desired location.

8 Claims, 3 Drawing Sheets

BALANCED TIRE ASSEMBLY AND METHOD

FIELD OF THE INVENTION

The present invention relates generally to pneumatic tires, and more particularly to a material which can be added to a tire inner liner to balance the tire.

BACKGROUND OF THE INVENTION

Pneumatic tires have found many applications in a variety of vehicles, such as passenger automobiles, aircraft and industrial machinery. It is well known that a small amount of imbalance in a pneumatic tire mounted to a vehicle can cause undesirable vibration and noise when the tire is rotating at the operating speeds of the vehicle. This imbalance can be attributed to non-uniformities or imperfections in the tire wheel rim, or to imperfections or non-uniformities in the molded tire itself. Such imbalance is particularly noticeable on tires used on aircraft landing gear, due to the high wheel speeds attained during take-off and landing of the aircraft.

One approach to eliminating or reducing the effects of imbalance in formed tires has been to secure discrete patches of rubber material to the tire inner liner in an effort to offset the imbalance. This approach requires determining the amount and location of imbalance of the formed tire, typically in a dynamic testing machine. Based upon the results of the imbalance testing, a determination is made as to the location and mass of the patch material needed to counteract the imbalance of the tire. The inner surface of the tire is thereafter cleaned at the appropriate location, typically using an organic solvent, and the patch is adhered at the desired location. Rubber patches commonly used for balancing tires are generally provided in fixed weight increments, thereby limiting the precision to which the imbalance may be corrected, and requiring users to maintain an inventory of patches in various sizes.

The present invention seeks to provide a balance material that can be added to the inner liner of pneumatic tires to more easily and more precisely correct tire imbalance and to eliminate the need for maintaining an extensive inventory of balance patches.

SUMMARY OF THE INVENTION

The present invention provides a balanced tire assembly which includes a balance material that is selectively applied to the inner surface of the tire to correct imbalance conditions of the tire. The balance material has a first viscosity that facilitates fluently applying the balance material to the inner surface of the tire. After it has been applied to the inner surface, the balance material transforms to a second, higher viscosity, so that the balance material remains affixed to the inner surface of the tire at the desired location. This transformation may occur automatically after the balance material is applied to the inner surface, or it may require some action on the part of the person applying the balance material to initiate the transformation.

In one aspect of the invention, the balance material is applied to the inner surface of the tire in a fluid state, and subsequently transforms to a solid state. In another aspect of the invention, the balance material is initially thixotropic, so that it can be fluently applied to the inner surface of the tire in an agitated condition, and substantially maintains its shape and position on the inner surface. Thereafter, the balance material transforms to a solid state.

In another aspect of the invention, the balance material comprises silicone. In yet another aspect of the invention, the balance material comprises a fill material selected to add mass to the balance material, thereby reducing the volume of balance material needed to correct a given imbalance. In another aspect of the invention, a piece of flexible, solid material may be applied to the inner surface of the tire, atop the balance material, to add additional mass for correcting the imbalance condition.

In another aspect of the invention, a method of balancing a tire includes determining the amount of imbalance present in the tire, determining the location and amount of balance material needed to compensate for the imbalance, applying the balance material to the inner surface of a tire at a first viscosity, and transforming the balance material to a second, higher viscosity, so that the balance material remains affixed to the inner surface of the tire at the desired location.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
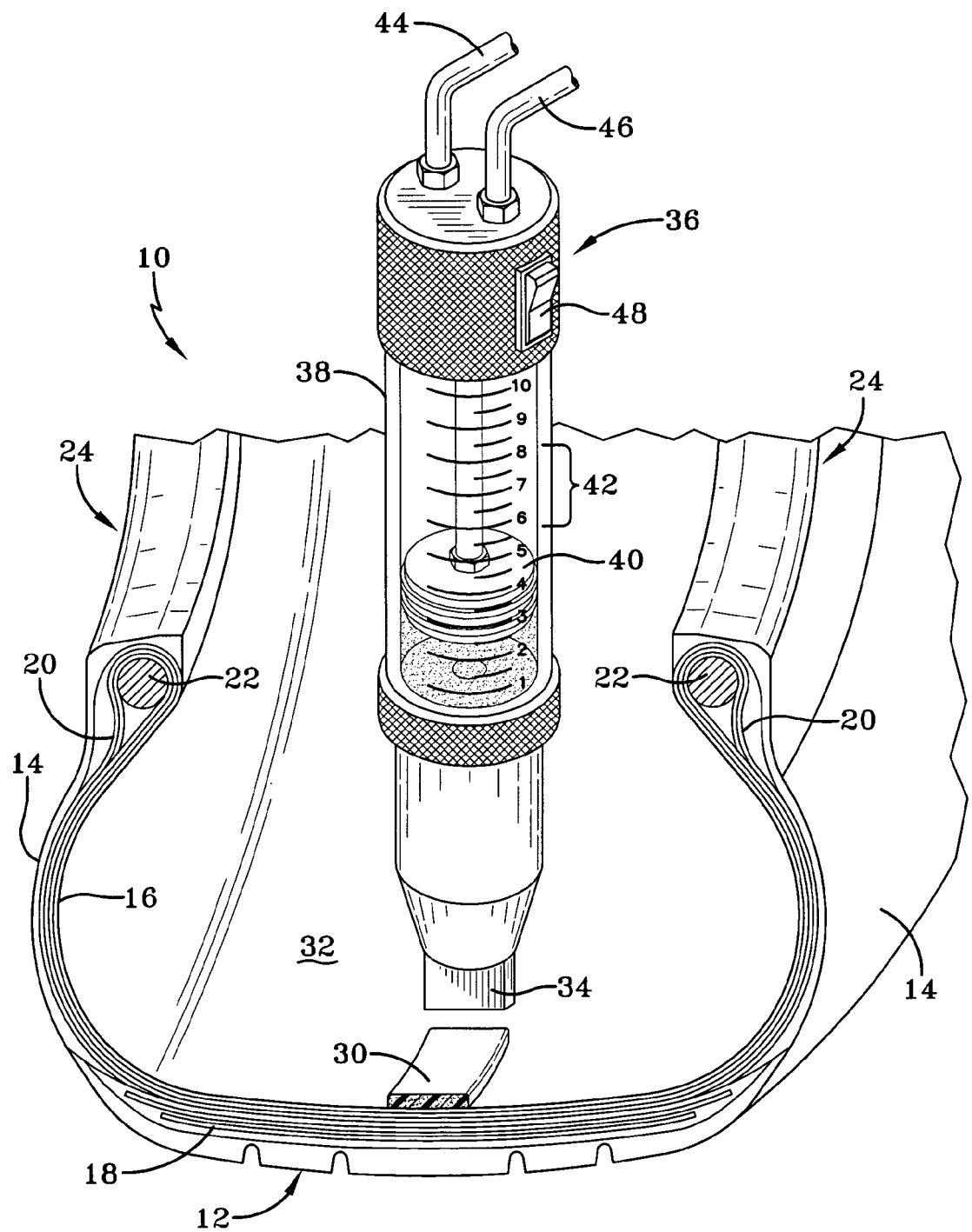
FIG. 1 is a partial cross-sectional view depicting the application of an exemplary balance material to the inner liner of a tire in accordance with the principles of the present invention.

FIG. 1 depicts an exemplary tire 10, in cross-section, to which a balance material 30 in accordance with the present invention has been applied along an inner surface 32 thereof. The tire 10 includes a tread 12 and sidewalls 14 molded around a carcass reinforcing ply 16 and one or more belts 18, as known in the art. The carcass reinforcing ply 16 has opposed ends 20 which are wrapped around circumferentially extending bead cores 22 to form the rim engaging portions 24 of the tire. The balance material 30 is applied at discrete locations along the inner surface 32, defined by the carcass reinforcing ply 16 or inner liner of the tire 10. The balance material exhibits a first viscosity which allows it to be fluently applied to the inner surface of the tire at the desired location and in a substantially precise amount to thereby offset the tire imbalance which has been determined, for example, on a dynamic tire balancing machine.

After application of the balance material 30 to the inner surface 32 of the tire 10, the balance material 30 is transformed so that it is less fluid and thereby remains affixed to the inner surface 32 of the tire 10 at the desired location. In one embodiment, the balance material 30 has a first viscosity in the range of about $1.5 \times 10^5$ centipoise to about $1.0 \times 10^7$ centipoise so that the balance material 30 may be fluently applied to the inner surface 32 of the tire 10. After application to the inner surface 32 of the tire 10, the balance material 30 transforms to exhibit a second viscosity greater than about $1.0 \times 10^8$ centipoise, with a measurable hardness in the range of about 30 Shore A durometer to about 70 Shore A durometer, such that the balance material 30 remains substantially affixed where it has been applied to the inner surface 32.

In another embodiment, the balance material 30 transforms to a substantially solid state. While the transformed balance material 30 is solid, it remains flexible so as to conform to the deformations of the tire 10 when used on a vehicle. In another embodiment, the balance material 30 is initially thixotropic so that it can be fluently applied to the inner surface 32 of the tire 10, while in an agitated condition or by application of a shear force to the balance material 30, and substantially maintains its shape and position on the inner surface 32 of the tire 10 after the agitation or shear force has been removed. Thereafter the balance material 30 transforms to a second substantially solid state.

The transformation of the balance material 30 may occur automatically after it has been applied to the inner surface of the tire, for example, by drying or curing. Alternatively, the transformation may require some action by the person applying the balance material to the tire. For example, the balance material might require the application of heat, light, or moisture, or various other conditions or additives, to initiate the transformation.

Because the balance material 30 exhibits a first viscosity that permits the material to be fluently applied to the inner surface 32, the material may be dispensed from a dispensing unit 36 comprising a reservoir 38 which contains the balance material 30, and a movable plunger 40 for expelling or extruding the balance material 30 to the inner surface 32 through a tip 34. The reservoir 38 may be provided with graduated markings 42 to facilitate dispensing substantially precise amounts of balance material 30 to the inner surface 32. In the embodiment shown, the dispensing unit 36 is coupled to pneumatic supply lines 44, 46, the operation of which is controlled by a switch 48. Piston 40 may be raised and/or lowered to thereby dispense balance material 30 to the inner surface 32. While dispensing unit 36 is depicted herein as a pneumatically actuated device, it will be recognized that various other devices for dispensing balance material 30 to the inner surface 32 of tire 10 may be utilized.

In one embodiment, the balance material 30 comprises a silicone rubber adhesive, such as Loctite 5900®, available from Henkel Loctite Group, Rocky Hill, Conn. The balance material 30 may further comprise a fill material selected to add mass to the balance material 30 and thereby reduce the amount of balance material 30 required to correct a predetermined imbalance condition in a manufactured tire. For example, the fill material may include one or more of iron oxide, zinc oxide, lead oxide or other materials suitable for increasing the mass of the balance material 30.

In another embodiment of the invention, a method for balancing a manufactured tire 10 includes applying a balance material 30 at a first viscosity to at least a portion of an inner surface 32 of a tire 10, and transforming the viscosity of the balance material 30 to a second viscosity which is greater than the first viscosity, so that the balance material 30 is substantially fixed to the inner surface 32 of the tire 10. Generally, the balance material 30 should be applied at a location which has been predetermined, for example, by testing the manufactured tire 10 on a dynamic balancing machine, as known in the art. The results of the dynamic test indicate the location and amount of imbalance present in the manufactured tire so that the location and amount of a corresponding balance mass needed to correct the imbalance may be calculated. In accordance with the principles of the invention, the balance material 30 described above is thereafter applied to a portion of the inner surface 32 of the tire 10 corresponding to the location determined from the dynamic balance test.

Figure 2:
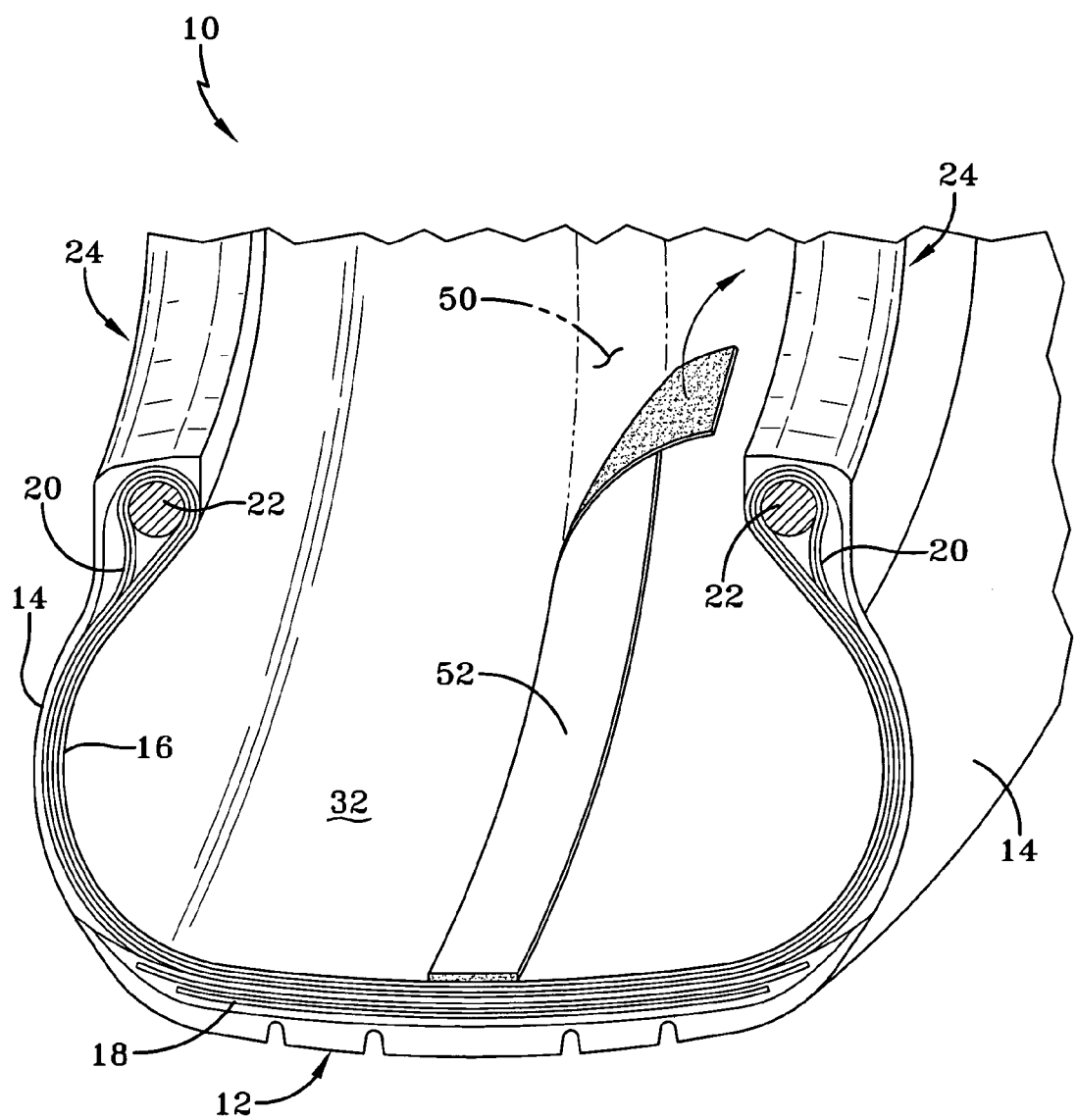
FIG. 2 depicts a protective film material being removed from a tire inner liner prior to the application of balance material.

For best results, the inner surface 32 of the tire 10 should be free from mold release material and other contaminants which may be present on the tire surfaces, for example, as a result of manufacturing processes. The presence of such contaminants generally adversely affects adhering the balance material 30 to the inner surface 32 of the tire 10. A sufficient surface for adhering the balance material 30 may be obtained by cleaning the inner surface 32 of the tire 10, for example, with solvent cleaning materials, at least at a target location 50 where the balance material 30 is to be applied. As depicted in FIG. 2, a sufficiently clean surface may alternatively be obtained by applying a removable film material 52, at least at a target location 50, such as circumferentially along the mid-section of the inner surface 32, prior to forming the tire 10 in a mold, as discussed in U.S. Patent Application Publication No. 2004/0103967, assigned to the assignee of the present invention and incorporated by reference herein in its entirety. The removable film material 52 protects the inner surface 32 of the tire 10 from mold release material or other contaminants and provides a sufficiently clean surface for adhering the balance material 30 after the film 52 has been removed from the formed tire 10.

Figure 3:
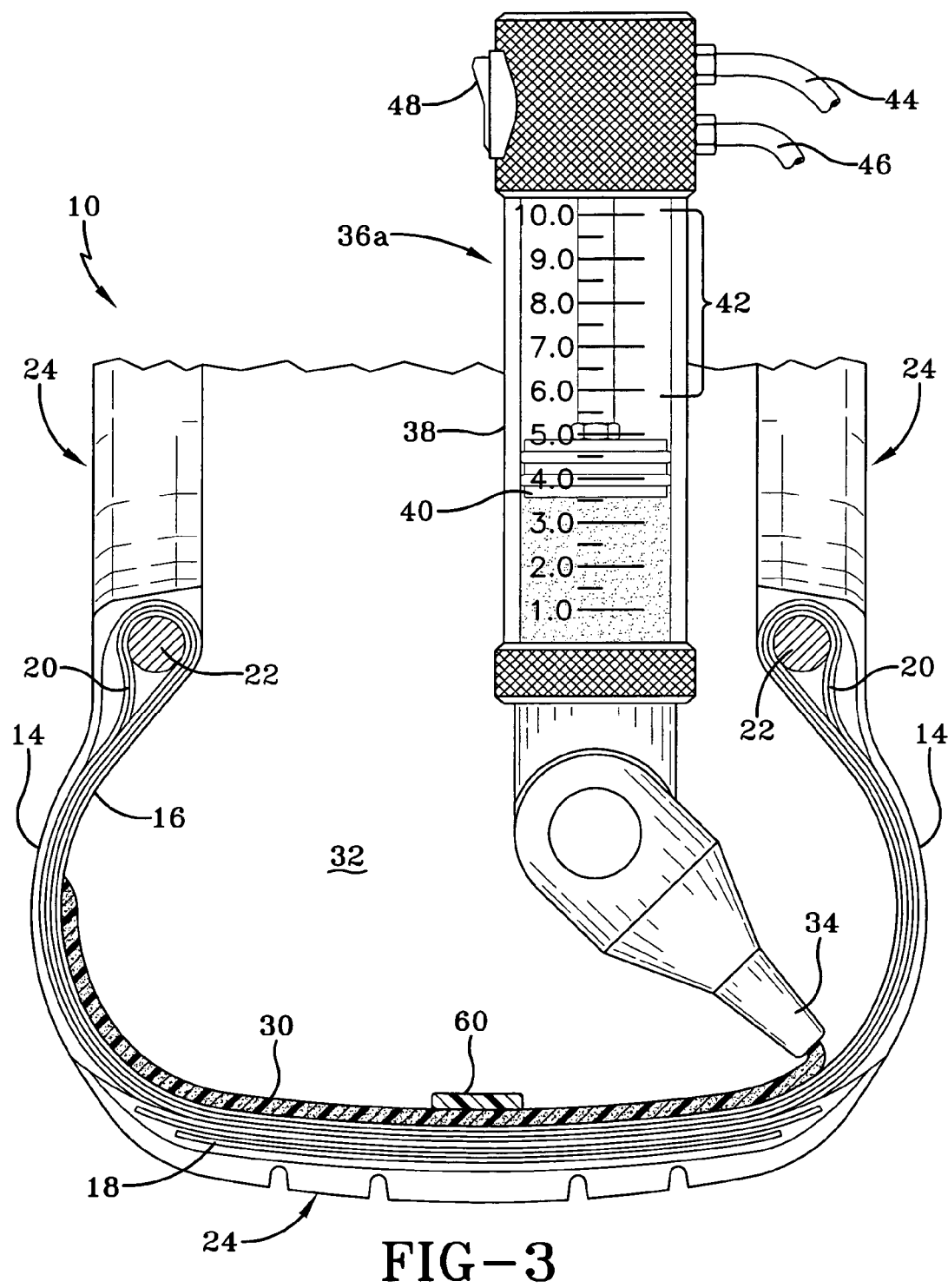
FIG. 3 depicts an exemplary balance material being applied to the inner liner of a tire along an axial direction thereof.

While FIG. 1 depicts a balance material 30 being applied to the inner surface 32 of a tire 10 in a substantially circumferential direction, it will be recognized that the balance material 30 may be applied in various other ways to counteract the inherent imbalance of a manufactured tire 10. For example, FIG. 3 depicts a balance material 30 in accordance with the present invention being applied to the inner surface 32 in a substantially axial direction. To facilitate application of the balance material 30 in this manner, a dispenser 36a, similar to that described above with respect to FIG. 1, may be utilized. The dispenser 36a includes an articulating tip 34 that facilitates applying the balance material 30 in an axial direction along the inner surface 32 of the tire 10.

The following example illustrates one embodiment of the present invention.

EXAMPLE

A Goodyear aircraft tire, size 27.75×8.75-14.5, was manufactured at Goodyear's facility in Danville, Va. The inner liner of the tire was kept free from mold release material and other contaminants by applying a strip of Nylon 6,6 film material around the inner circumference of the tire prior to molding, in a manner generally described in co-pending U.S. Patent Application Publication No. 2004/0103967. After the tire was removed from the mold, the film material was removed from the inner liner and 30 g of Loctite 5900® was deposited on the inner liner, in the area kept clean by the film material. After the Loctite 5900® solidified, the tire was run in a dynamometer until the tire was damaged. Inspection of the tire showed that the Loctite 5900® remained adhered to the inner liner, beyond the durability life of the tire.

In another embodiment of the invention, a piece of flexible, solid material 60 may be applied to the inner surface 32 of the tire 10, atop the balance material 30, to further increase the added mass at the desired location for correcting the tire imbalance, as depicted in FIG. 3. The flexible, solid material 60 may be formed from rubber or other polymeric materials, and may be trimmed to attain a desired mass, or it may be formed from other materials suitable for adding mass to a tire while having sufficient flexibility to conform to the deformations experienced by the tire during use.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A method of balancing a tire, comprising:
   applying a balance material to at least a portion of an inner surface of a tire along an axial direction of the tire, the balance material exhibiting a first viscosity when applied to the tire and transforming to exhibit a second viscosity greater than the first viscosity, so that the balance material is substantially fixed to the inner surface; and
   applying a flexible solid member atop the balance material, such that the balance material is disposed between the flexible solid member and the inner surface of the tire and the flexible solid member is positioned entirely within the boundaries of the balance material.

2. The method of claim 1, wherein said balance material is in a fluid state when it is applied to said inner surface, and subsequently transforms to a solid state.

3. The method of claim 1, wherein said balance material is thixotropic when applied to said inner surface.

4. The method of claim 1, further comprising:
   determining the amount of imbalance in a tire; and
   determining the location and amount of balance material to be added to the inner surface of the tire to compensate for the tire imbalance.

5. The method of claim 1, further comprising:
   cleaning the inner surface of the tire, at least at the location where the imbalance material is to be applied.

6. The method of claim 1, further comprising:
   protecting the inner surface of the tire from contaminants with a removable film prior to forming the tire in a mold; and
   removing the film prior to applying the balance material to thereby expose a clean surface where the balance material will be applied.

7. The method of claim 1, wherein applying the balance material comprises:
   extruding the balance material through a dispensing tip to the inner surface of the tire; and
   articulating the dispensing tip relative to a reservoir to move the tip in an axial direction of the tire.

8. The method of claim 1, wherein applying the balance material comprises:
   manually actuating a switch to selectively start and stop the dispensing of balance material from a dispensing tip.

* * * * *